(12) United States Patent
Kosobucki et al.

(10) Patent No.: US 9,589,054 B2
(45) Date of Patent: Mar. 7, 2017

(54) METHOD OF INTERACTING WITH WEB SITES ALLOWING COMMENTING

(71) Applicant: Webfire, LLC, Verona, WI (US)

(72) Inventors: Brian Kosobucki, Verona, WI (US); Nathan Kroms Davis, Madison, WI (US)

(73) Assignee: Webfire, LLC, Verona, WI (US)

( * ) Notice: Subject to any disclaimer, the term of this patent is extended or adjusted under 35 U.S.C. 154(b) by 594 days.

(21) Appl. No.: 13/828,975

(22) Filed: Mar. 14, 2013

(65) Prior Publication Data

US 2014/0282116 A1 Sep. 18, 2014

(51) Int. Cl.
G06F 3/00 (2006.01)
G06F 17/30 (2006.01)
G06F 3/048 (2013.01)

(52) U.S. Cl.
CPC ........ G06F 17/30864 (2013.01); G06F 3/048 (2013.01)

(58) Field of Classification Search
CPC ......... G06F 17/30867; G06F 17/30864; G06F 3/04842
See application file for complete search history.

(56) References Cited

U.S. PATENT DOCUMENTS

| | | | | |
|---|---|---|---|---|
| 7,941,428 B2* | 5/2011 | Huston | ............. | G06F 17/30864 707/706 |
| 8,082,242 B1* | 12/2011 | Mysen et al. | ................. | 707/711 |
| 8,354,937 B2* | 1/2013 | Vander Veen | .......... | G06F 21/36 340/3.1 |
| 8,417,791 B1* | 4/2013 | Peretz | ..................... | H04L 63/08 379/201.02 |
| 8,522,010 B2* | 8/2013 | Ozzie | ...................... | G06F 21/43 713/155 |
| 9,015,245 B1* | 4/2015 | Lee | ................... | H04L 29/06476 709/203 |
| 2002/0073058 A1* | 6/2002 | Kremer | ............. | G06F 17/30864 |
| 2008/0052634 A1* | 2/2008 | Fishkin | ............. | G06F 17/30899 715/753 |

(Continued)

FOREIGN PATENT DOCUMENTS

JP 2011113358 A * 6/2011

OTHER PUBLICATIONS

Le et al., Scoring Web-based Vulnerability Impact using Property-Based Vulnerability Model; IEEE; © 2010; 6 pages.*

*Primary Examiner* — Linh K Pham
(74) *Attorney, Agent, or Firm* — Fogg & Powers LLC

(57) ABSTRACT

Device implemented method interacts with a plurality of web sites using a predetermined key word to create a subset of the plurality of web sites. Which of the subset of the plurality of web sites allow placement of comments on a respective one of the subset of the plurality of web sites is determined creating a list of a plurality of commentable web sites containing the predetermined key word and which allow placement of comments. The list of the plurality of commentable web sites is supplied to a user. A plurality of steps, different for each commentable web site, to post the comments on each of the plurality of commentable web sites is determined and stored. The plurality of steps to post the comments on each of the plurality of commentable web sites is subsequently repeated, separately for each of the plurality of commentable web sites.

34 Claims, 20 Drawing Sheets

(56) References Cited

U.S. PATENT DOCUMENTS

| | | | |
|---|---|---|---|
| 2008/0147354 A1* | 6/2008 | Rowan | G06Q 30/02 702/182 |
| 2009/0138472 A1* | 5/2009 | MacLean | G06F 17/30864 |
| 2009/0185669 A1* | 7/2009 | Zitnik | H04M 3/02 379/217.01 |
| 2009/0248516 A1* | 10/2009 | Gross | G06F 17/30899 705/14.66 |
| 2010/0058202 A1* | 3/2010 | Rostom | 715/758 |
| 2011/0082849 A1* | 4/2011 | Rakowski et al. | 707/706 |
| 2011/0099192 A1* | 4/2011 | Ravikumar | G06F 17/30705 707/769 |
| 2011/0153451 A1* | 6/2011 | Bitz | G06Q 30/0631 705/26.7 |
| 2011/0209207 A1* | 8/2011 | Issa et al. | 726/7 |
| 2011/0218930 A1* | 9/2011 | Black | G06Q 30/0185 705/318 |
| 2012/0095980 A1* | 4/2012 | Elyada | G06F 17/30864 707/706 |
| 2012/0215798 A1* | 8/2012 | Burris | G06F 17/30864 707/755 |
| 2013/0024784 A1* | 1/2013 | Lifton | G06Q 50/01 715/753 |
| 2013/0031032 A1* | 1/2013 | Mehta | G06F 17/30911 706/12 |
| 2013/0073336 A1* | 3/2013 | Heath | 705/7.29 |
| 2013/0073989 A1* | 3/2013 | Harris | G06Q 10/10 715/758 |
| 2013/0080437 A1* | 3/2013 | Rassi | G06Q 30/0601 707/737 |
| 2013/0086027 A1* | 4/2013 | Hebert | 707/706 |
| 2013/0103624 A1* | 4/2013 | Thieberger | G06N 99/005 706/12 |
| 2013/0103747 A1* | 4/2013 | Mizuki | A63F 13/87 709/203 |
| 2013/0124425 A1* | 5/2013 | Agrawal | H04L 9/3247 705/75 |
| 2013/0275857 A1* | 10/2013 | Norwood | G06F 17/2247 715/234 |
| 2014/0089099 A1* | 3/2014 | Money | G06F 3/0485 705/14.66 |
| 2015/0170172 A1* | 6/2015 | Gichuhi | 705/7.32 |

\* cited by examiner

MACROLEADS FIRE

IF YOU ACCIDENTALLY CLICKED NO TO THIS SECURITY WARNING, PLEASE CLICK HERE TO RELOAD    JAVA LOAD

FIND FORUMS AND BLOGS RELATED TO A KEYWORD OF YOUR CHOICE. SIMPLY TYPE IN A KEYWORD AND WE PULL 50 SIMILAR HIGH RANKING KEYWORDS. THEN WE CHECK FIRST PAGE RESULTS ON GOOGLE, YAHOO, AND BING FOR FORUMS ON WHICH YOU CAN LEAVE REVIEWS, BACKLINKS, ETC.

KEYWORD
KEYWORD YOU WISH TO SEARCH FOR RANKED FORUMS WITH:

PETS

SEARCH

Fig. 7

| KEYWORD LIST |
|---|
| ADOPT A PET |
| MONTHLY SEARCHES: 301000 |
| VIRTUAL PETS |
| MONTHLY SEARCHES: 135000 |
| PET |
| MONTHLY SEARCHES: 45500000 |
| PET SHOPS |
| MONTHLY SEARCHES: 2240000 |
| PET STORES |
| MONTHLY SEARCHES: 2240000 |
| FREE PETS |
| MONTHLY SEARCHES: 246000 |
| PET FINDER |
| MONTHLY SEARCHES: 823000 |
| PET STORE |
| MONTHLY SEARCHES: 2240000 |
| PET SUPERMARKET |
| MONTHLY SEARCHES: 90500 |
| ONLINE PET SHOP |
| MONTHLY SEARCHES: 135000 |
| DOGS |
| MONTHLY SEARCHES: 45500000 |
| PET SUPPLIES |
| MONTHLY SEARCHES: 1000000 |
| PET CLASSIFIEDS |
| MONTHLY SEARCHES: 49500 |
| PET INSURANCE |
| MONTHLY SEARCHES: 550000 |
| PET PRODUCTS |
| MONTHLY SEARCHES: 368000 |
| PET RESCUE |
| MONTHLY SEARCHES: 301000 |
| ONLINE PET STORE |
| MONTHLY SEARCHES: 605000 |
| ADOPT PET |
| MONTHLY SEARCHES: 301000 |

Fig. 8

| RESULTS | | | | | |
|---|---|---|---|---|---|
| SITE | KEYWORD | SEARCH ENGINE | RANK | MONTHLY SEARCHES | SCORE |
| HTTP://WWW.PETRPG.COM/ | VIRTUAL PETS | BING | 8 | 135000 | 16875 |
| HTTP://WWW.ADOPTAPET.COM/ | ADOPT A PET | BING | 1 | 301000 | 301000 |
| HTTP://WWW.ADOPTAPET.COM/DOG-ADOPTION | ADOPT A PET | BING | 3 | 301000 | 100333 |
| HTTP://ADOPT-A-PET.ADOPTAPET.COM/ | ADOPT A PET | BING | 4 | 301000 | 75250 |
| HTTP://MUTTSLIKEME.ADOPTAPET.COM/INDEX.HTML | ADOPT A PET | BING | 7 | 301000 | 43000 |
| HTTP://BLOG.ADOPTAPET.COM/ | ADOPT A PET | BING | 8 | 301000 | 37625 |
| HTTP://WWW.ADOPTAPET.COM/ | ADOPT A PET | YAHOO | 1 | 301000 | 301000 |
| HTTP://WWW.ADOPTAPET.COM/DOG-ADOPTION | ADOPT A PET | YAHOO | 3 | 301000 | 100333 |
| HTTP://ADOPT-A-PET.ADOPTAPET.COM/ | ADOPT A PET | YAHOO | 4 | 301000 | 75250 |
| HTTP://MUTTSLIKEME.ADOPTAPET.COM/INDEX.HTML | ADOPT A PET | YAHOO | 7 | 301000 | 43000 |
| HTTP://BLOG.ADOPTAPET.COM/ | ADOPT A PET | YAHOO | 9 | 301000 | 33444 |
| HTTP://EN.WIKIPEDIA.ORG/WIKI/POLYETHYLENE.TEREPHTH... | PET | GOOGLE | 3 | 45500000 | 15166667 |
| HTTP://WWW.PETRPG.COM/ | VIRTUAL PETS | YAHOO | 8 | 135000 | 16875 |
| HTTP://WWW.VIRTUALPETLIST.COM/ | VIRTUAL PETS | YAHOO | 9 | 135000 | 15000 |
| HTTP://WWW.PETA.ORG/ISSUES/COMPANION-ANIMALS/PET-S... | PET SHOPS | GOOGLE | 7 | 2240000 | 320000 |

SITE: REDGECKOSTUDIO.COM
INTERNET LINKS FOUND: 3

KEYWORD: WISCONSIN WEDDING PHOTOGRAPHY
TITLE MATCHES: [2/10] DESCRIPTION MATCHES: 2/10 URL MATCHES: [0/10]
- ⊙ YOU HAVE AN GOOD CHANCE OF RANKING FOR THIS KEYWORD, IF YOU TARGET IT IN YOUR SITE
- ⚠ YOU DON'T HAVE THE KEYWORD IN YOUR TITLE TAG!
- ⚠ YOU DON'T HAVE THE KEYWORD IN YOUR KEYWORDS TAG!
- ⚠ YOU DON'T HAVE THE KEYWORD IN YOUR DESCRIPTION TAG!
- ⊙ YOU HAVE THE KEYWORD IN YOUR HEADING TAG!

SHOW ADVANCED

KEYWORD: WISCONSIN WEDDING PHOTOGRAPHY
TITLE MATCHES: [3/10] DESCRIPTION MATCHES: [0/10] URL MATCHES: [0/10]
- ⚠ YOU HAVE AN OKAY CHANCE OF RANKING FOR THIS KEYWORD, IF YOU TARGET IT IN YOUR SITE...
- ⚠ YOU DON'T HAVE THE KEYWORD IN YOUR TITLE TAG!
- ⚠ YOU DON'T HAVE THE KEYWORD IN YOUR KEYWORDS TAG!
- ⚠ YOU DON'T HAVE THE KEYWORD IN YOUR DESCRIPTION TAG!
- ⊙ YOU HAVE THE KEYWORD IN YOUR HEADING TAG!

SHOW ADVANCED

KEYWORD: WISCONSIN WEDDING PHOTOGRAPHY
TITLE MATCHES: [2/10] DESCRIPTION MATCHES: [0/10] URL MATCHES: [0/10]
- ⚠ YOU HAVE AN OKAY CHANCE OF RANKING FOR THIS KEYWORD, IF YOU TARGET IT IN YOUR SITE...

Fig. 15

BACK

SUMMARY | ADVANCED

KEYWORDS: MADISON WEDDING PHOTOGRAPHER
URL: REDGECKOSTUDIO.COM

URL | TITLE | DESCRIPTION | H1 / H2 TAGS | IMAGES | RELATED KEYWORDS | BACKLINKS

RELATED KEYWORDS, ACCORDING TO GOOGLE.
NOTICE THE [+] MARKED KEYWORDS, THESE REPRESENT POSSIBLE FAST RANKING KEYWORDS:

HOT
- 10,000+ MONTHLY GOOGLE SEARCHES
- A GOOGLE 'COMPETITION' RATING OF 'LOW'
- OTHER FACTORS THAT ESTIMATE HOW COMPETITIVE THEY ARE
- *NOTE NOT ALL OF THESE KEYWORDS NECESSARILY APPLY, BUT GOOGLE CONSIDERS THEM 'SEARCH TREND RELATED'

WARM
- 10,000+ MONTHLY GOOGLE SEARCHES
- A GOOGLE 'COMPETITION' RATING OF 'LOW' OR 'MEDIUM'
- *NOTE NOT ALL OF THESE KEYWORDS NECESSARILY APPLY, BUT GOOGLE CONSIDERS THEM 'SEARCH TREND RELATED'

| KEYWORD | ESTIMATED SEARCHES | COMPETITION |
|---|---|---|
| AFFORDABLE WEDDING PHOTOGRAPHERS | 22200 | HIGH |
| AWARD WINNING WEDDING PHOTOGRAPHER | 1600 | HIGH |
| BAY AREA WEDDING PHOTOGRAPHERS | 1900 | HIGH |
| BEACH WEDDING PHOTOGRAPHER | 12100 | MEDIUM |
| BEST WEDDING PHOTOGRAPHER | 33100 | MEDIUM |
| BEST WEDDING PHOTOGRAPHERS | 27100 | HIGH |
| CHEAP WEDDING PHOTOGRAPHER | 22200 | HIGH |
| CHEAP WEDDING PHOTOGRAPHERS | 18100 | HIGH |
| CREATIVE WEDDING PHOTOGRAPHER | 3600 | MEDIUM |
| DESTINATION WEDDING PHOTOGRAPHER | 5400 | MEDIUM |

Fig. 16

BACK

SUMMARY | ADVANCED

KEYWORDS: MADISON WEDDING PHOTOGRAPHER
URL: REDGECKOSTUDIO.COM

URL | TITLE | DESCRIPTION | H1 / H2 TAGS | IMAGES | RELATED KEYWORDS | BACKLINKS

BACKLINKS ARE USED BY SEARCH ENGINES TO DETERMINE HOW RELEVANT YOUR SITE IS.

IN MOST CIRCUMSTANCES YOU WILL WANT TO HAVE NEAR THE MEDIAN NUMBER OF THE BACKLINKS FOR THIS KEYWORD, TO BE COMPETITIVE.

- SOMETIMES THE TOP RESULTS WILL INCLUDE DOMAINS LIKE 'WIKIPEDIA.COM', THIS WILL SKEW THE AVERAGE
- DETERMINE WHICH SITES YOU ARE COMPETING WITH, AND MAKE IT A GOAL TO HAVE AS MANY BACKLINKS AS THEM
- *AVERAGE AND MEDIAN RESULTS EXCLUDE YOUTUBE, GOOGLE, YAHOO, WIKIPEDIA AND EHOW

| DOMAIN NAME | BACKLINKS |
|---|---|
| HTTP://TADPHOTO.COM/WEDDING/ | 44 |
| HTTP://WWW.LISAMADDENPHOTOGRAPHY.COM/ | 10 |
| HTTP://WWW.NEWANGUSSTUDO.COM/ | 6 |
| HTTP://WWW.MYWEDDING.COM/MADISON | 25800 |
| HTTP://WWW.ANDAMRIEBLOG.COM/ | 10 |
| HTTP://WWW.ATRUELIKENESS.COM/ | 12 |
| REDGECKOSTUDIO.COM | 56 |
| AVERAGE NUMBER OF BACKLINKS | 4314 |
| AVERAGE NUMBER OF BACKLINKS | 11 |

RECOMMENDATION:
YOU HAVE 500% OF THE MEDIAN AMOUNT OF BACKLIKS, GOOD JOB!
YOU SHOULD ALWAYS BE LOOKING FOR WAYS TO GET MORE BACKLINKS.

Fig. 17

SITE: REDGECKOSTUDIO.COM
INTERNET LINKS FOUND: 3

KEYWORD: WISCONSIN WEDDING PHOTOGRAPHY
TITLE MATCHES: 2/10   DESCRIPTION MATCHES: 2/10   URL MATCHES: 0/10

⊙ YOU HAVE AN GOOD CHANCE OF RANKING FOR THIS KEYWORD, IF YOU TARGET IT IN YOUR SITE

⚠ YOU DON'T HAVE THE KEYWORD IN YOUR TITLE TAG!

⚠ YOU DON'T HAVE THE KEYWORD IN YOUR KEYWORDS TAG!

⚠ YOU DON'T HAVE THE KEYWORD IN YOUR DESCRIPTION TAG!

⊙ YOU HAVE THE KEYWORD IN YOUR HEADING TAG!

HIDE ADVANCED

| URL | TITLE | META KEYWORDS | DESCRIPTION | H-TAG | IMAGES |
|---|---|---|---|---|---|
| ⌂ REDGECKOSTUDIO.COM | MADISON WEDDING... | WISCONSIN WEDDI... | RED GECKO STUDI... | 1 | 14 |
| PORTRAITS.REDGECKOSTUDIO.COM | WORDPRESS&RSAQ... | NO KEYWORD | NO DESCRIPTION | 3 | 1 |
| REDGECKOSTUDIO.COM/BLOG | RED GECKO STUDI... | WISCONSIN WEDDI... | PROFESSIONAL WE... | 7 | 87 |

KEYWORD: WISCONSIN WEDDING PHOTOGRAPHY
TITLE MATCHES: 3/10   DESCRIPTION MATCHES: 0/10   URL MATCHES: 0/10

⚠ YOU HAVE AN OKAY CHANCE OF RANKING FOR THIS KEYWORD, IF YOU TARGET IT IN YOUR SITE...

⚠ YOU DON'T HAVE THE KEYWORD IN YOUR TITLE TAG!

⚠ YOU DON'T HAVE THE KEYWORD IN YOUR KEYWORDS TAG!

⚠ YOU DON'T HAVE THE KEYWORD IN YOUR DESCRIPTION TAG!

Fig. 19

| | |
|---|---|
| ⊙ | TAKE NOTE, THIS IS GOOD! |
| ⚠ | UH OH, WE MAY HAVE A PROBLEM. |
| ⊗ | WE FOUND A PROBLEM, YOU SHOULD FIX THIS! |

⊙ YOU HAVE A GOOD CHANCE OF RANKING FOR THIS KEYWORD, IF YOU TARGET IT IN YOUR SITE.

⚠ YOU DON'T HAVE THE KEYWORD IN YOUR TITLE! FIX WITH THE TAG TOOL

⚠ YOU DON'T HAVE THE KEYWORD IN YOUR KEYWORD TAG! FIX WITH THE TAG TOOL

⚠ YOU DON'T HAVE THE KEYWORD IN YOUR DESCRIPTION! FIX WITH THE TAG TOOL

⊙ YOU HAVE AN H TAG KEYWORD MATCH!

⊗ YOU HAVE IMAGES ON YOUR WEBSITE WITHOUT ALT TAGS!
(14) IMAGES WITH (10) ALT TAGS DETAILS

HERE ARE SOME RELATED KEYWORDS (HINT: RUN A SITE ANALYSIS ON THESE KEYWORDS)

| KEYWORD | ESTIMATED SEARCHES | COMPETITION |
|---|---|---|
| MADISON WI WEDDING PHOTOGRAPHERS | 1300 | HIGH |
| MADISON WEDDING PHOTOGRAPHERS | 1600 | HIGH |
| WEDDING PHOTOGRAPHERS MADISON WI | 1300 | HIGH |
| WEDDING PHOTOGRAPHER MADISON WI | 1600 | HIGH |

SEE MORE RELATED KEYWORDS

⊙ YOU HAVE MORE BACKLINKS (55) THAN THE MEDIAN (11)

FOR THE TOP 6 WEBSITES RANKING FOR THAT KEYWORD:
• AN AVERAGE OF 4,314 BRACKETS. (LOWEST 6, HIGHEST OF 25800).

Fig. 20

METHOD OF INTERACTING WITH WEB SITES ALLOWING COMMENTING

FIELD

The present invention relates to methods, and storage media containing instructions for performing such methods, for interacting with web sites and, more particularly, to methods, and storage media containing instructions for performing such methods, for interacting with web sites involving commenting.

BACKGROUND

The internet is broadly used in society today and is broadly used for commerce. Businesses rely on the internet, and on individual web sites on the internet, to conduct business which can range from information gathering and information delivery, e.g., business location, contact information and descriptions about the business, to electronic commerce in which businesses or individuals buy, sell and transfer merchandise and arrange over the internet for the delivery of services. Thus, not only is the internet widely used for non-commercial purposes, commercial use of the internet is widespread.

With the internet used so widely, there are a great number of web sites available on the internet. Finding a desired or useful web site is made somewhat easier through the use of search engines which typically use a key word or key words to return search results suggesting closely aligned web sites. A number of different search engine vehicles exist and are a business in themselves supported by advertising. Search engines generally have criteria to decide which web sites to return from search requests. A web site more closely meeting those criteria may receive a higher ranking, i.e., either be including more prominently in the search results or even be included at all.

A merchant or other business entity, or an individual, having a web site and wanting to do business with others on the internet faces the task of making others aware of the target web site. One way to make others aware of a target web site is, of course, to have the target web site appear in search results that others request of search engines. It is even better if the target web site receives a higher search ranking and hence appears more prominently to the search requester.

While the criteria which various search engines use to rank search results are not completely known, it is believed that certain factors may increase a search ranking. For example, a key word search will search for occurrences of the key word. The existence of the key word in the target web site or, perhaps, the number of occurrences or context of the usage of the key word may increase the search ranking of a web site. Likewise, it is believed that "in links" to a web site from other web sites may increase the search ranking of a target web site. That is, a web site that is linked to from other web sites may receive a higher search ranking that an identical web site without such "in links."

SUMMARY

A web site may manually create or increase usage of a particular key word with which the web site desires to be associated with in a web search. A web site may also contact other web site owners and attempt to obtain "in links" from other web sites. Whether or not such techniques are actually effective in increasing search ranking, it is time consuming and arduous to manually attempt such steps.

A series of largely automated web tools are provided which can achieve many, if not all, of the above described manual techniques, and others, to possibly increase the search ranking of a web site. Such web tools are not merely a duplication of known manual techniques. Rather, the web tools described use different techniques that would be cumbersome or very difficult to achieve manually are used to achieve automated results that are not otherwise achievable. In an embodiment, the automated techniques described allow the automated posting of comments on other web sites.

In an embodiment, a device implemented method interacts with a plurality of web sites. The plurality of web sites are found using a predetermined key word to create a subset of the plurality of web sites containing the predetermined key word. Which of the subset of the plurality of web sites allow placement of comments on a respective one of the subset of the plurality of web sites is determined creating a list of a plurality of commentable web sites containing the predetermined key word and which allow placement of comments. The list of the plurality of commentable web sites is supplied to a user.

In an embodiment, the determining step comprises searching the subset of the plurality of web sites for specific input elements which allow for the placement of comments.

In an embodiment, the determining step comprises searching the subset of the plurality of web sites for code tags indicative of allowance for the placement of comments.

In an embodiment, the determining step comprises searching the subset of the plurality of web sites for identifiers of internet forum software packages.

In an embodiment, the determining step comprises searching the subset of the plurality of web sites for the string "comment".

In an embodiment, the determining step comprises searching the subset of the plurality of web sites for a leaf element that contains at least a predetermined number of words, contains the string "comment", and does not contain the string "site comment".

In an embodiment, the determining step comprises searching the subset of the plurality of web sites for a lowercase type attribute which is at least one of "button" and "submit", a lowercase value attribute contains the string "comment" and the lowercase value attribute does not contain the string "site comment".

In an embodiment, a plurality of steps, different for each of the plurality of commentable web sites, to post the comments on each of the plurality of commentable web sites is determined, respectively. The plurality of steps to post the comments on each of the plurality of commentable web sites is stored in digital memory. The plurality of steps to post the comments on each of the plurality of commentable web sites is subsequently repeated, separately for each of the plurality of commentable web sites.

In an embodiment, the determining step comprises determining, separately for each of the plurality of commentable web sites, whether cookies are utilized to post the comments of each of the plurality of commentable web sites.

In an embodiment, the storing in digital memory step comprises storing, separately for each of the plurality of commentable web sites, respective cookies unique for each of the plurality of commentable web sites.

In an embodiment, the determining step comprises utilizing, separately for each of the plurality of commentable web sites, POST and GET commands to determine the plurality of steps, different for each of the commentable web sites, to post the comments on each of the commentable web sites, respectively.

In an embodiment, the storing in digital memory step comprises providing a step by step recording process to a user to implement the specific web forms used to accomplish the plurality of steps to post the comments on each of the plurality of commentable web sites.

In an embodiment, the subsequently repeating step comprises rendering the specific web forms in sequence to accomplish the plurality of steps to post the comments on each of the plurality of commentable web sites.

In an embodiment, the storing in digital memory step further comprises allowing the user to mark the specific web forms for later user input.

In an embodiment, the subsequently repeating step further comprises highlighting a specific portion of the specific web forms marked by the user for user input to accomplish the plurality of steps to post the comments on each of the plurality of commentable web sites.

In an embodiment, the step of the subsequently repeating step comprises posting different content of each of the plurality of commentable web sites.

In an embodiment, the step of modifying the comments of one of the plurality of web sites for use in posting on another of the plurality of commentable web sites.

In an embodiment, at least one of the subset of the plurality of web sites is automatically modified to increase a search ranking of the at least one of the subset of the plurality of web sites.

In an embodiment, a device implemented method interacts with web sites. A a plurality of steps, different for each of a plurality of commentable web sites, is determined to post comments on each of the plurality of commentable web sites, respectively. The plurality of steps to post the comments on each of the plurality of commentable web sites is stored in digital memory. Separately for each of the commentable web sites, the plurality of steps to post the comments on each of the plurality of web sites is subsequently repeated.

In an embodiment, the determining step comprises determining, separately for each of the plurality of commentable web sites, whether cookies are utilized to post the comments of each of the plurality of commentable web site.

In an embodiment, the storing in digital memory step comprises storing, separately for each of the plurality of commentable web sites, respective cookies unique for each of the plurality of commentable web sites.

In an embodiment, the determining step comprises utilizing, separately for each of the plurality of commentable web sites, POST and GET commands to determine the plurality of steps, different for each of the commentable web sites, to post the comments on each of the commentable web sites, respectively.

In an embodiment, the storing in digital memory step comprises providing a step by step recording process to a user to implement the specific web forms used to accomplish the plurality of steps to post the comments on each of the plurality of commentable web sites.

In an embodiment, the subsequently repeating step comprises providing the user or another user with the specific web forms in sequence to accomplish the plurality of steps to post the comments on each of the plurality of commentable web sites.

In an embodiment, the storing in digital memory step further comprises allowing the user to mark the specific web forms for later user input.

In an embodiment, the subsequently repeating step further comprises highlighting a specific portion of the specific web forms marked by the user for user input to accomplish the plurality of steps to post the comments on each of the plurality of commentable web sites.

In an embodiment, the step of the subsequently repeating step comprises posting different content of each of the plurality of commentable web sites.

In an embodiment, the comments of one of the plurality of web sites are modified for use in posting on another of the plurality of commentable web sites.

In an embodiment, a machine readable storage medium stores executable program instructions which when executed cause a data processing system to perform a method. A plurality of web sites is found using a predetermined key word to create a subset of the plurality of web sites containing the predetermined key word. Which of the subset of the plurality of web sites allow placement of comments on a respective one of the subset of the plurality of web sites are determined creating a list of a plurality of commentable web sites containing the predetermined key word and which allow placement of comments. The list of the plurality of commentable web sites is supplied to a user.

In an embodiment, the determining step comprises searching the subset of the plurality of web sites for specific input elements which allow for the placement of comments.

In an embodiment, the determining step comprises searching the subset of the plurality of web sites for code tags indicative of allowance for the placement of comments.

In an embodiment, the determining step comprises searching the subset of the plurality of web sites for identifiers of internet forum software packages.

In an embodiment, the determining step comprises searching the subset of the plurality of web sites for the string "comment".

In an embodiment, the determining step comprises searching the subset of the plurality of web sites for a leaf element that contains at least a predetermined number of words, contains the string "comment", and does not contain the string "site comment".

In an embodiment, the determining step comprises searching the subset of the plurality of web sites for a lowercase type attribute which is at least one of "button" and "submit", a lowercase value attribute contains the string "comment" and the lowercase value attribute does not contain the string "site comment".

In an embodiment, a plurality of steps, different for each of the plurality of commentable web sites, is determined. The plurality of steps to post the comments on each of the plurality of commentable web sites is stored in digital memory. The plurality of steps to post the comments on each of the plurality of commentable web sites is subsequently repeated, separately for each of the plurality of commentable web sites.

In an embodiment, the determining step comprises determining, separately for each of the plurality of commentable web sites, whether cookies are utilized to post the comments of each of the plurality of commentable web sites.

In an embodiment, the storing in digital memory step comprises storing, separately for each of the plurality of commentable web sites, respective cookies unique for each of the plurality of commentable web sites.

In an embodiment, the determining step comprises utilizing, separately for each of the plurality of commentable web sites, POST and GET commands to determine the plurality of steps, different for each of the commentable web sites, to post the comments on each of the commentable web sites, respectively.

In an embodiment, the storing in digital memory step comprises providing a step by step recording process to a user to implement the specific web forms used to accomplish the plurality of steps to post the comments on each of the plurality of commentable web sites.

In an embodiment, the subsequently repeating step comprises rendering the specific web forms in sequence to accomplish the plurality of steps to post the comments on each of the plurality of commentable web sites.

In an embodiment, the storing in digital memory step further comprises allowing the user to mark the specific web forms for later user input.

In an embodiment, the subsequently repeating step further comprises highlighting a specific portion of the specific web forms marked by the user for user input to accomplish the plurality of steps to post the comments on each of the plurality of commentable web sites.

In an embodiment, the step of the subsequently repeating step comprises posting different content of each of the plurality of commentable web sites.

In an embodiment, the comments of one of the plurality of web sites are modified for use in posting on another of the plurality of commentable web sites.

In an embodiment, at least one of the subset of the plurality of web sites is automatically modified to increase a search ranking of the at least one of the subset of the plurality of web sites.

DRAWINGS

FIG. 7 is a screen shot of a step in the process of finding relevant web sites by selecting a key word;

FIG. 8 is a screen shot of a step in the process of finding relevant web sites showing related key words;

FIG. 9 is a screen shot of a step in the process of finding relevant web sites showing search engine rankings for relevant web sites found;

FIG. 11 is a screen shot of a first step in the process of recording the steps of posting content to a commentable web site highlighting material to be modified;

FIG. 15 is an exemplary screen shot illustrating the results of submitted keyword phrases "wisconsin wedding photography", "madison wedding photographer" and "wisconsin wedding photographer".

FIG. 16 is an exemplary screen shot illustrating related key words including highlighting those words designated "hot" (over 10,000 monthly Google searches) and "warm" (over 1,000 monthly Google searches).

FIG. 17 is an exemplary screen shot illustrating the results of an analysis indicating back links, or "in links", to a target web site.

FIG. 19 and FIG. 20 are an exemplary screen shots illustrating the results of an analysis of a target web site and containing suggestions to improve the search ranking of the target web site.

DESCRIPTION

In order to increase the search result ranking of a given, or target, web site it may be desirable to have "in links" to the target web site from other web sites. One technique to do so may be to leave comments on other web sites that may make reference to or a link to the target web site. However, creating such comments manually is a time-consuming and arduous task.

Figure 1:
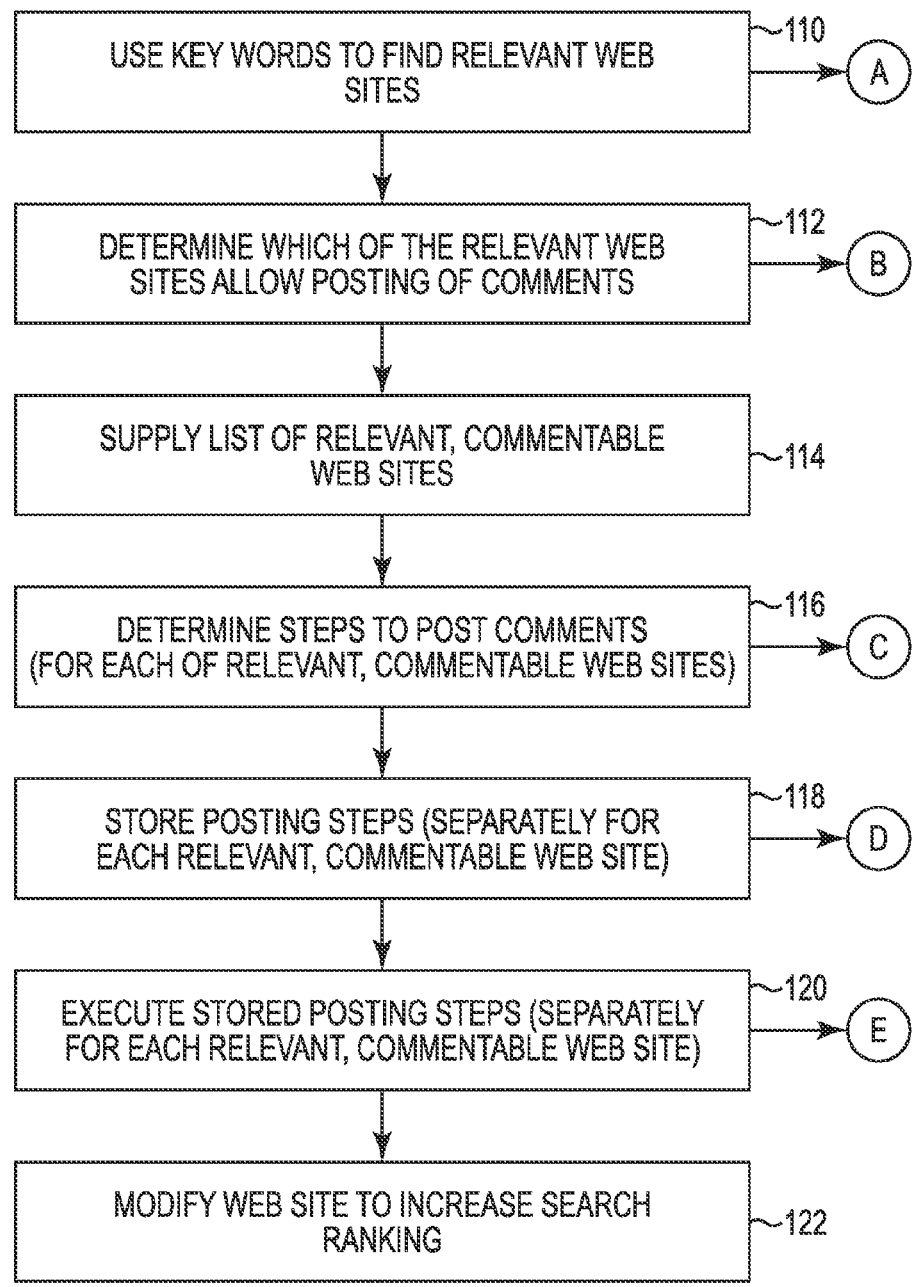
FIG. 1 is a flow chart illustrating a plurality of automated web tools for web sites.

An automated technique for interacting with a plurality of web sites is illustrated in the flow chart of FIG. 1. While the flow chart of FIG. 1 is illustrated, and described, in sequential detail, it is to be recognized and understand that it is not required that the flow chart be implemented in the sequence illustrated and described. Further, it is to be recognized and understood that not all of the steps or techniques illustrated and described need to be performed. One or more of the steps or techniques may be implemented to achieve a partial result without necessarily implementing all of the steps or techniques illustrated and described. It is not necessary to perform every step of FIG. 1, nor all of the steps or techniques illustrated and described with respect to the detailed flow charts in FIGS. 2 through 6.

A first step that may be performed is to find (110) relevant or more relevant web sites that are at least somewhat related to the target web site. A search term or terms may be submitted to a well know search engine. Some or all of the web sites returned from the search request may be used as a set of web sites that are considered relevant to the target web site. Alternatively, the web sites returned from the search request may be perused manually and the list of relevant web sites may be culled or restricted for a better relevant fit to the target web site.

Taking the list of relevant web sites, the list is further filtered by determining (112) which ones of the list of relevant web sites allow for the placement of comments. Each individual one of the web sites on the list of relevant web sites, or a culled list, is automatedly searched to determine whether comments may be left on the web site by visitors or users of the web site.

Optionally, that list of relevant and commentable web sites may be presented (114) to a user. A user viewing or processing that list of relevant and commentable web sites may then manually, if the user chooses, either cull the list further based on other criteria or may exit the automated process and perform one or more of the following steps manually. In an embodiment, the list of relevant and commentable web sites is presented on a display, for example, in a web browser. In addition or alternatively, the list of relevant and commentable web sites may be supplied electronically, e.g., in a document such as a database, spreadsheet, word processing document or a PDF document.

For those relevant and commentable web sites, it may be determined (116) in particular what steps are performed in order to actually post comments on each such web site. It is expected that the steps involved may and probably will be different for many if not each of the relevant and commentable web sites. Once a set or sequence of steps is determined for a particular relevant and commentable web site, the set or sequence of steps may be stored (118) for future use. As an example, each relevant and commentable web site may be reviewed manually once in order to determine and record, as in recording a macro, the steps involved in actually placing a comment on the relevant and commentable web site. Alternatively, the process of determining (116) what steps are performed to post comments on a particular web site may be at least partially and perhaps fully through the use of web tools described later with respect to FIG. 4. The determining and storing steps are repeated for each individual one of the relevant and commentable web sites.

However obtained, once the set or sequence of steps to be performed to comment on each relevant and commentable web site is obtained, the steps or sequence may be automated (120) for each relevant and commentable web site without user intervention or with minimal user intervention. Not only may comments may be automated for each relevant and commentable web site but multiple comments, perhaps at multiple times, may be posted to each relevant and commentable web site.

Further, optionally (as most, if not all, of the steps of FIG. 1 are optional) the target web site may be modified (122) to increase the search engine ranking of the target web site. Further detail is provided in FIGS. 15 through 20.

Figure 2:
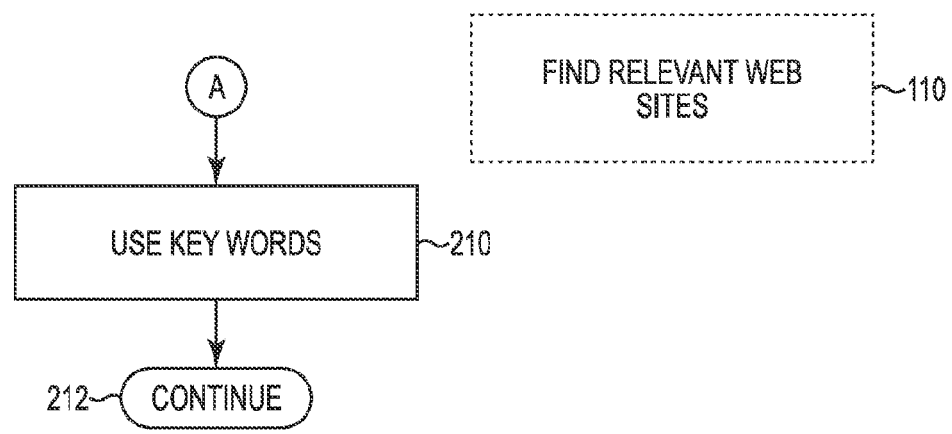
FIG. 2 is a flow chart illustrating detail of a portion of the flow chart of FIG. 1 related to finding relevant web sites.

Key words may be used (210) to assist in finding relevant web sites (110) (FIG. 2). A key word or key words or a key phrase may be performed using a conventional search engine. For example, if the target web site is related to wedding photography, it may be appropriate to use the search term or terms "photography", "photographer" or "wedding" to return a search result which contains a listing of web sites relevant to the target web site. After finding relevant web sites, the process may continue (212) by returning to the flow of FIG. 1, either to determining commenting step 112 or to one of the other steps illustrated in the flow chart of FIG. 1.

Figure 3:
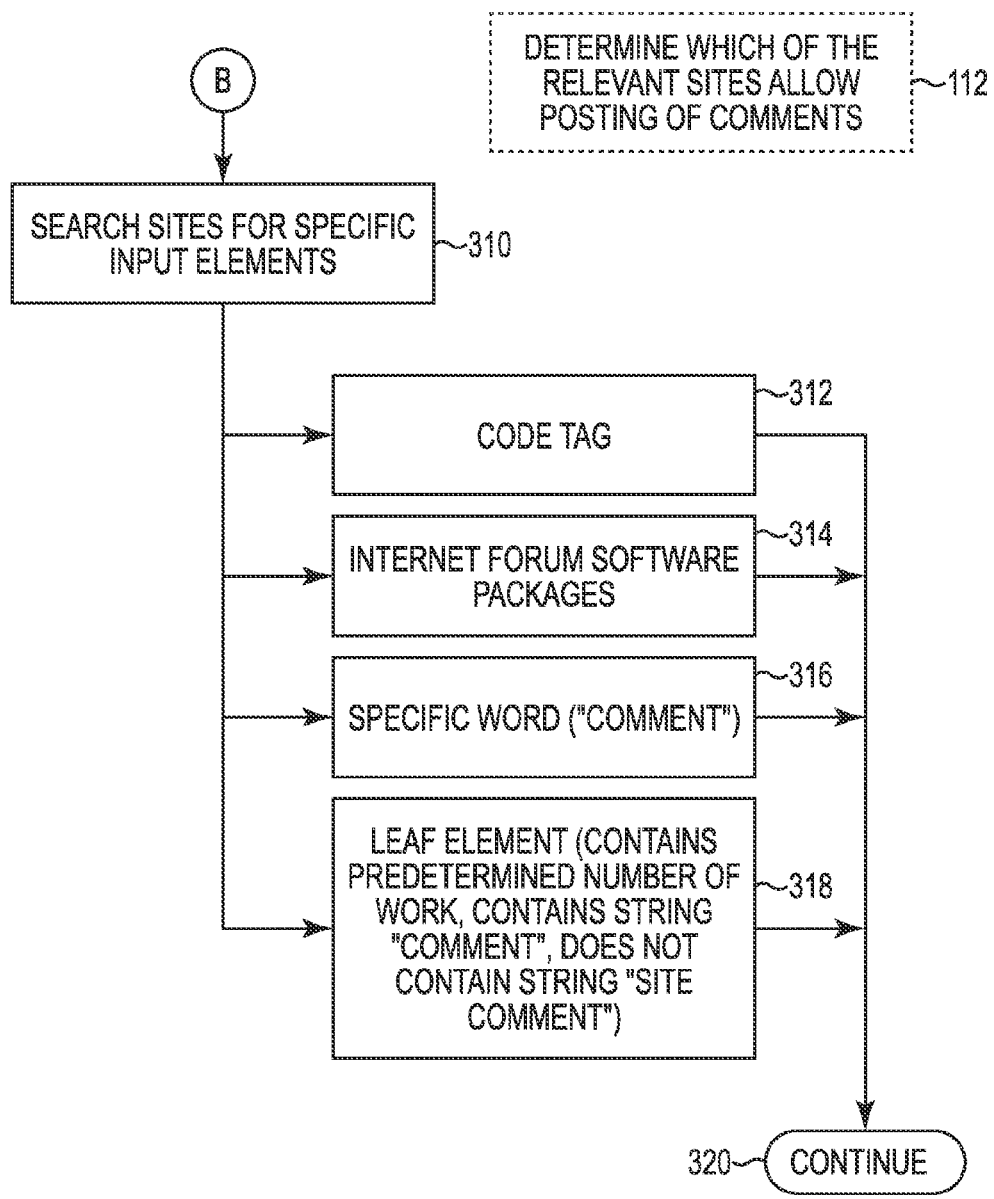
FIG. 3 is a flow chart illustrating detail of a portion of the flow chart of FIG. 1 related to determining which of the relevant web sites allow posting of comments.

FIG. 3 illustrates detail regarding the step of determining (112) which of the relevant web sites allow the posting of comments. Each relevant web site is individually searched (310) for specific input elements such as code tags (312), internet forum software packages (314), specific words (316) and/or leaf elements (318). Existing software facilitating the implementation of blogs or forums on each relevant web site may be searched (314) using known characteristics such as common and publically available software packages.

The existence of common and publically available software is indicative of an individual web site accepting comments but also gives clues or identifies steps that are to be performed on that web site using the software package to leave comments. Specific words (316) that may be identifiable as being indicative of a web site accepting comments are the existence of certain words, for example, the word "comment". Leaf elements (318) are indicated by the existence of a certain word or certain words, perhaps in context of the existence of another word or words within a certain context, for example, within five words of each other. Another leaf element may the existence of a string containing a word and not another word. For example, the existence of a string containing the word "comment" and not the existence of a string containing the phrase "site comment" may be indicative of a commentable web site. After determining which web sites are commentable, the process may continue (320) by returning to the flow of FIG. 1, either to supplying step 114 or to one of the other steps illustrated in the flow chart of FIG. 1.

Figure 4:
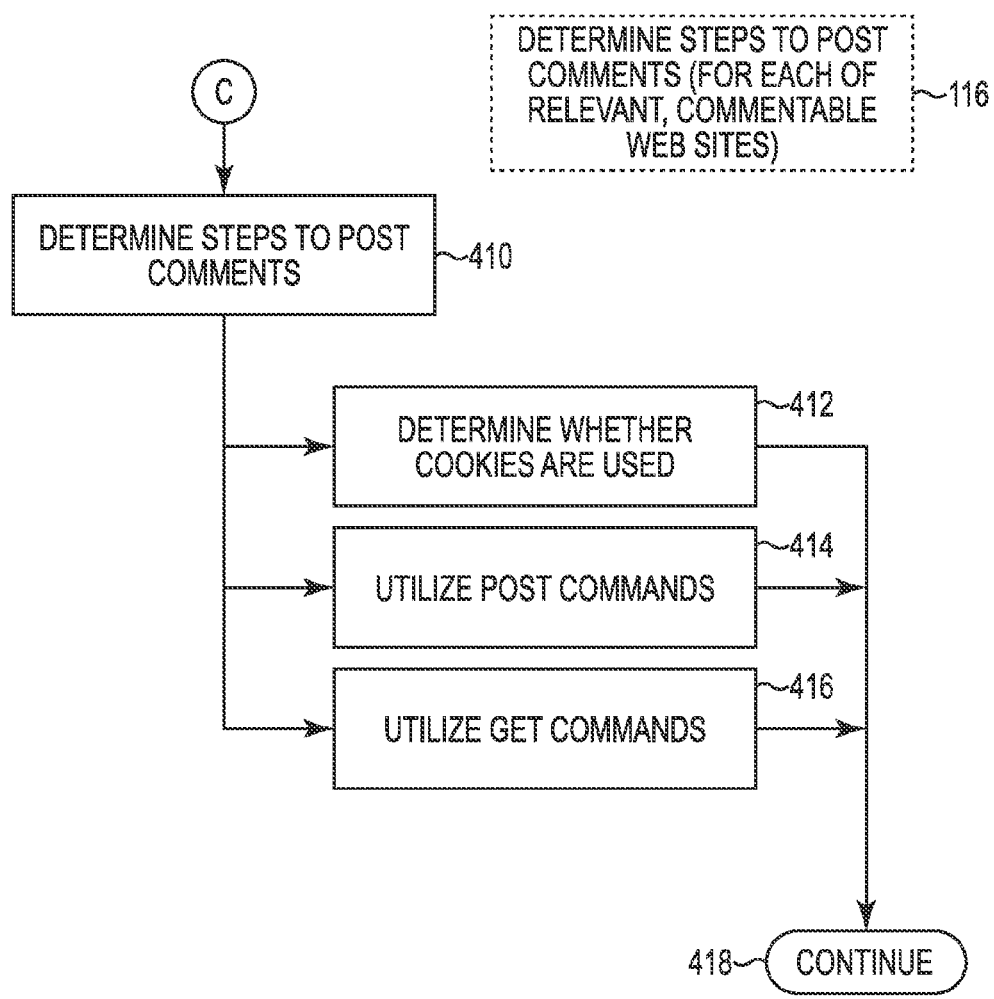
FIG. 4 is a flow chart illustrating detail of a portion of the flow chart of FIG. 1 related to determining steps to post comments on web sites.

FIG. 4 illustrates detail regarding the step of determining (116) the steps to post comments. Each relevant and commentable web site is analyzed (412) to determine whether or not "cookies" are utilized in the posting of comments on an individual site. If cookies are used or required then, as noted below, the cookie for each individual web site using cookies is determined and kept. Cookies would typically be required, if at all, to log into a web site as a prelude to posting comments. Each relevant and commentable web site is also analyzed to determine the use of "POST" commands (414) or "GET" commands (416). The use of POST and/or GET commands may assist in determining the steps required to post comments since such commands, or other similar commands, are fairly standard and well known. Hence, the procedures for responding to or using the POST and/or GET commands can also be more standardized. After determining which steps to take to post comments on each individual web site, the process may continue (418) by returning to the flow of FIG. 1, either to storing step 118 or to one of the other steps illustrated in the flow chart of FIG. 1.

Figure 5:
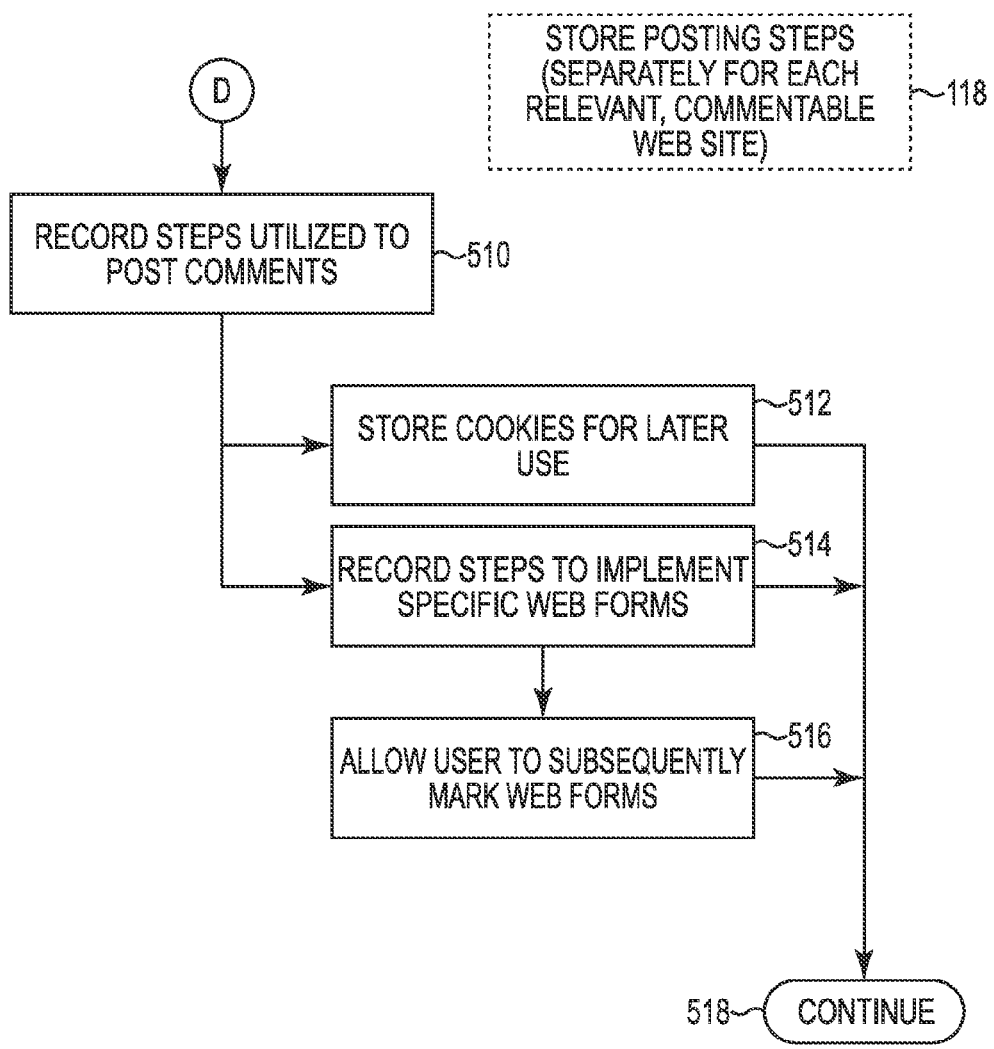
FIG. 5 is a flow chart illustrating detail of a portion of the flow chart of FIG. 1 related to storing posting steps to post comments on web sites.

FIG. 5 illustrates detail regarding the step of storing (118) the procedure to post comments. The steps utilized to post comments are recorded (510), perhaps in the manner of recording a macro if a user manually steps through the process of determining how to post comments. As noted above, if an individual web site uses or requires cookies to post comments, e.g., to log into the web site, then not only is the step of supplying the cookie be recorded but the content of the cookie is stored (512) so that the cookie may be supplied when the posting procedure is performed later. Further, if an individual web site uses a web form or web forms, the web form may be recorded (514), or at least the steps needed to fill the web form may be recorded. Further, the steps necessary, if any, for the user to mark or fill (516) the web form when the posting process is performed or repeated is also stored. After storing the steps required to post comments on each individual web site, the process may continue (518) by returning to the flow of FIG. 1, either to executing step 120 or to one of the other steps illustrated in the flow chart of FIG. 1.

Figure 6:
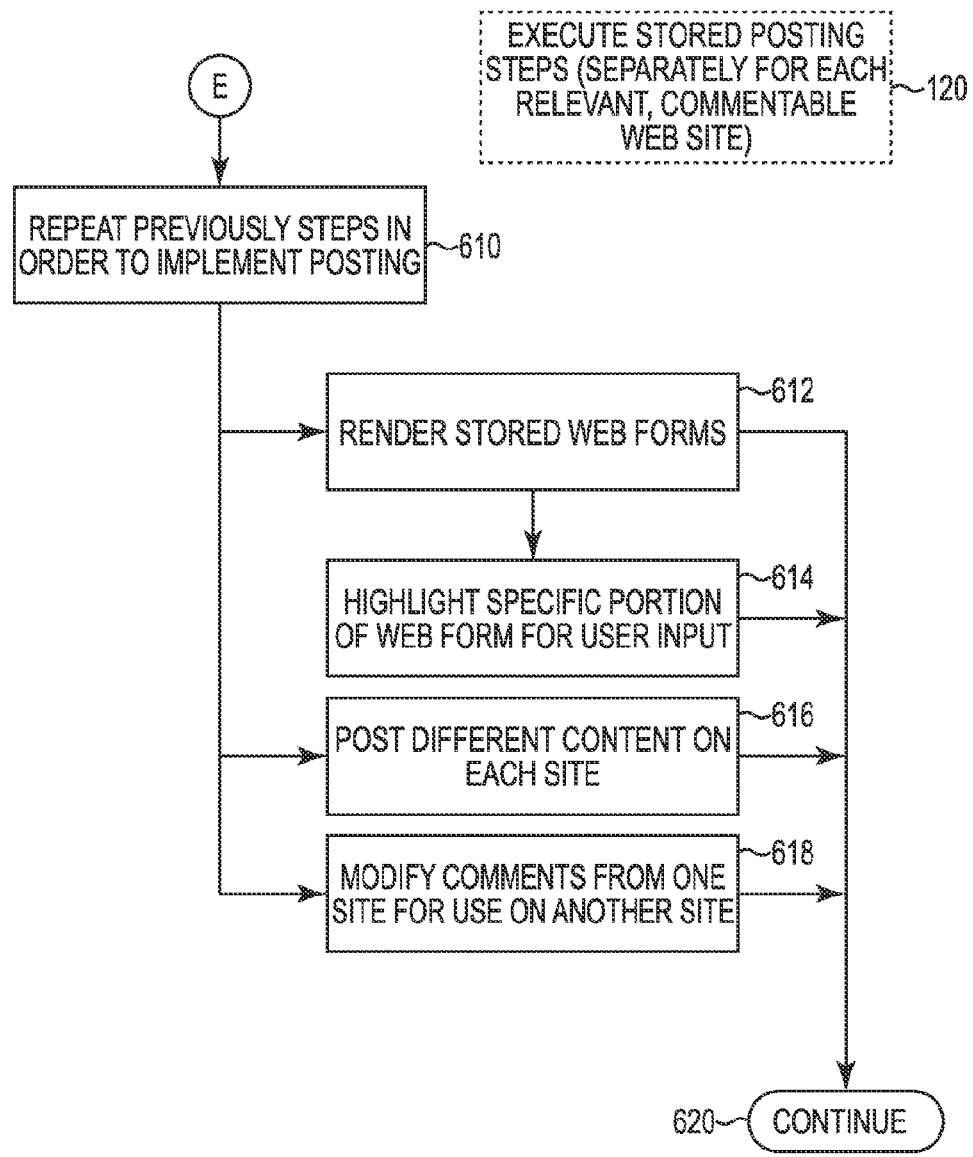
FIG. 6 is a flow chart illustrating detail of a portion of the flow chart of FIG. 1 related to executing stored posted steps to post comments on web sites.

FIG. 6 illustrates detail regarding the step of executing (120) the stored posting steps. The previously stored steps used or required to post comments on each of the individual relevant and commentable web sites are retrieved and executed (610) either for selected ones of the relevant and commentable web sites or for all of the relevant and commentable web sites individually and sequentially. Any web form used for an individual web site is retrieved and rendered (612) for use in posting a comment or comments on the individual web site. If a user is to make a manual input to any one or any portion of a web form, that specific portion requiring user input or user action is highlighted (614) on the rendered web form for ease in completing the web form. To help ensure that the same content doesn't end up being posted on each one of the relevant and commentable web sites, the content posted may be varied (618) from web site to web site. As an example, multiple versions of the basic text may be stored and different versions used on different web sites. After executing the stored instructions to post comments on each individual web site, the process may continue (620) by returning to the flow of FIG. 1, either to modification step 122 or to one of the other steps illustrated in the flow chart of FIG. 1.

As an example of finding relevant web sites (110), reference is made to FIG. 7 illustrating a web screen shot where a user may enter a keyword into the keyword text field. In the example, the user has entered the keyword "pets" into the keyword text field. The user then clicks "search".

In FIG. 8, a list of related keywords is generated and search engine statistics for those keywords are displayed. As an example, this may be done via the Google AdWords API (https://developers.google.com/adwords/api/. Other options such as the use of APIs from other companies may be used. Alternatively, web sites may be scraped for this information.

In FIG. 9, common search engines, such as Google, Yahoo and Bing, are used to search for web pages related to the keywords retrieved in FIG. 8. For each such page, it is determined if users can leave a comment or post on the web page. As an example, this is done if any of the following are true:

First, the HTML of the page contains one or more strings of characters that have been identified as forum identifiers, such as identifiers corresponding to various internet forum software packages. Examples are "ASPPlayground.NET" or "SimplyAJAX Forum System".

Second, the HTML page contains a leaf element, i.e., an element without child elements, whose lowercase text content satisfies the following three conditions: a) it contains at least five words; b) it contains the string "comment"; and c) it does not contain the string "site comment".

Third, the HTML contains at least one input element for which the following three conditions hold: a) the lowercase "type" attribute of the element is either "button" or "submit"; b) the lowercase "value" attribute of the element contains the string "comment"; and c) the lowercase "value" attribute of the element does not contain the string "site comment".

For all pages retrieved above on which users can leave comments or posts, i.e., commentable, a score is computed that is equal in most cases to the "monthly searches" traffic statistic retrieved (search traffic statistics above) divided by the search engine rank of the page. The results are then displayed as shown in FIG. 9.

Further details of the steps of recording posting steps (116) and executing stored posting steps (120) are provided in FIGS. 10 through 14. The process records the process of posting to an online forum, for example, along with ancillary activities like logging into an account, or any other web site on which visitors can enter content to be published on that site. Then, once the posting process is recorded, users can "playback" this process in order to easily post different content to the same site.

In general, visitor interactions with web forums involve web browsers sending HTTP GET and HTTP POST requests to web servers in response to user actions. The web browsers then graphically render the responses to those requests. HTTP GET requests, in general, although not in all cases, involve the web browser transmitting a request (like a web page) for a specific resource on the web server. HTTP POST requests, in general, although not in all cases, involve the web browser transmitting user entered information to the web server. So, for example, loading a forum home page could be a GET request, and logging in to a forum account could be a POST request.

Figure 10:
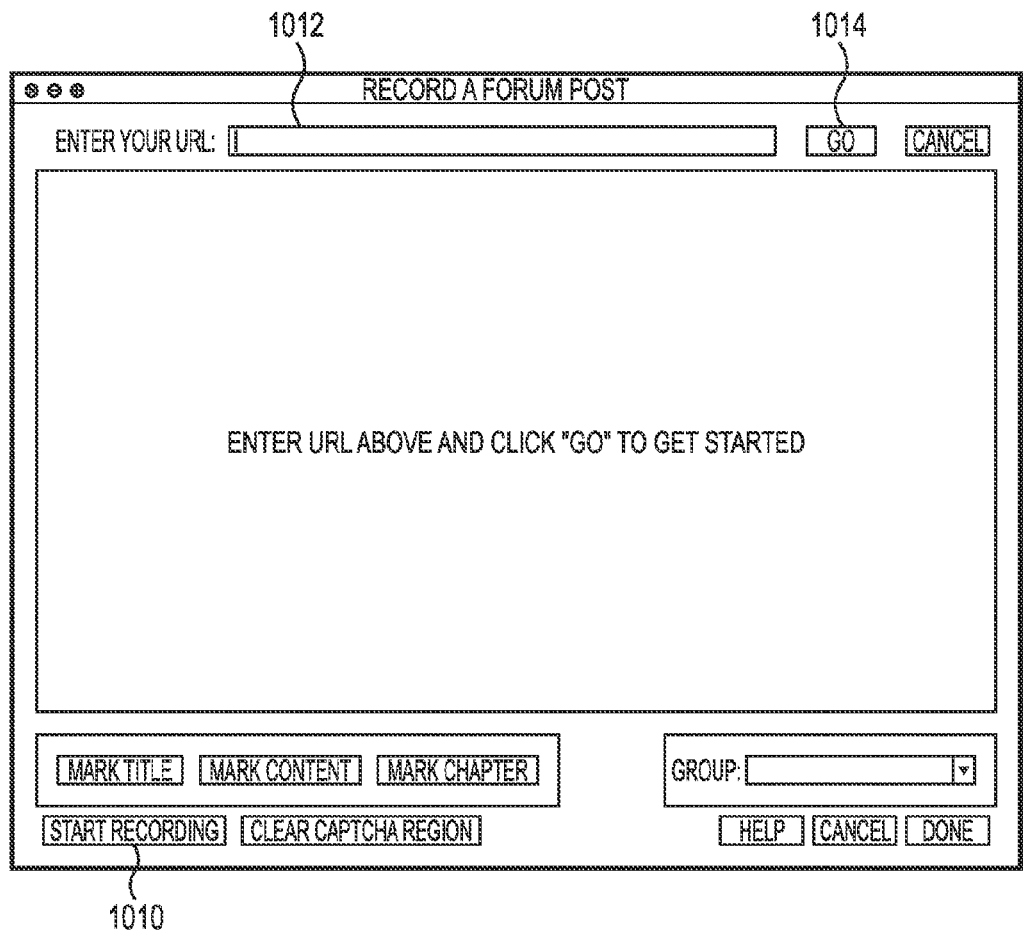
FIG. 10 is a screen shot of a first step in the process of recording the steps of posting content to a commentable web site showing an initial set up screen.

At the start of the process, users may be presented with the screen illustrated in FIG. 10. Users can click "start recording" 1010 in the lower left to begin the recording process. User will then enter a URL in the URL bar 1012 at the top of the screen shot and click "go" 1014, after which the web browser GUI component (blank in FIG. 10 except for "Enter a URL above . . . ") will load the web page at the URL and behave like a normal web browser. From the time that users click "start recording" 1010, all GET requests (such as entering a URL into the URL bar 1012 and clicking "go" 1014, or clicking on a web link), are recorded using the address of the requested resource.

Recording POST requests is more complex. Consider the screen shot illustrated in FIG. 11. There are a number of different text fields in this form. When a user plays back the POST event corresponding to the submission of this form in the future, the user will want to submit content that is different from that which they submitted during the recording process. In this example, future CAPTCHA code will need to be different, as will the content of the reply (the text field which is further down the page and not illustrated here).

Figure 11:
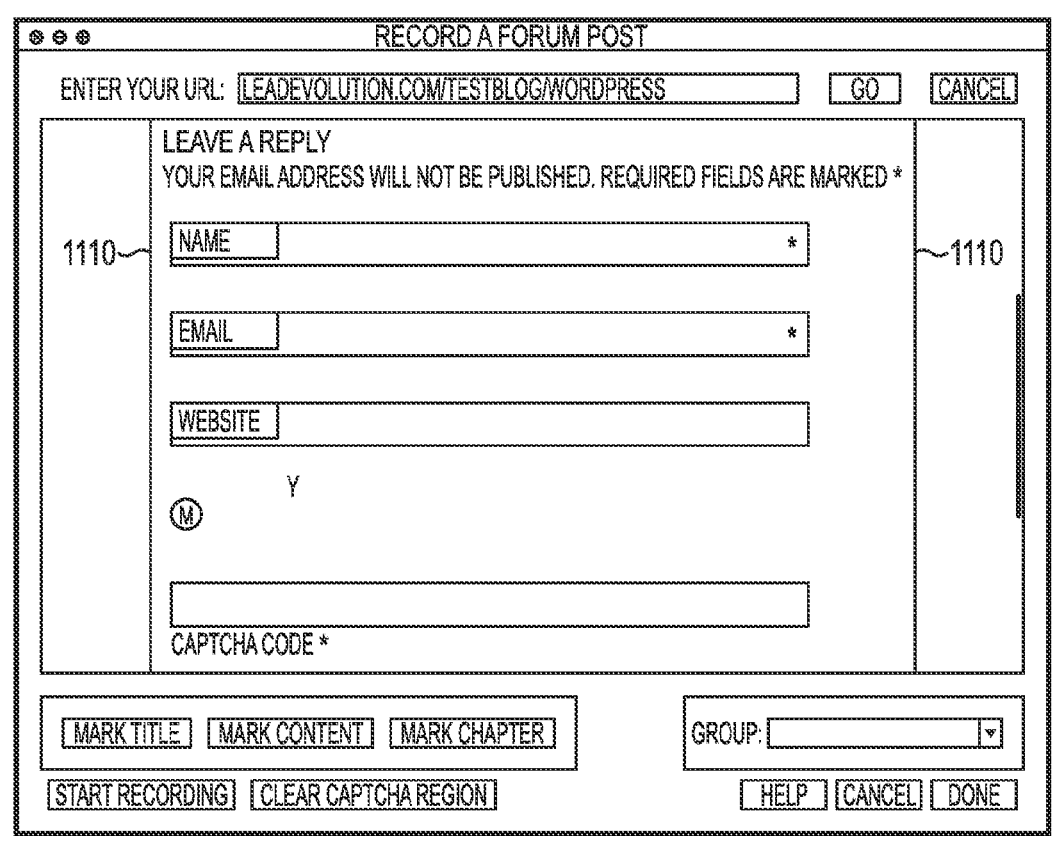

Forms whose submission can be successfully recorded, and modified in the future, are graphically identified by highlighting in yellow 1110 when the mouse or cursor is above them as shown in FIG. 11.

Figure 12:
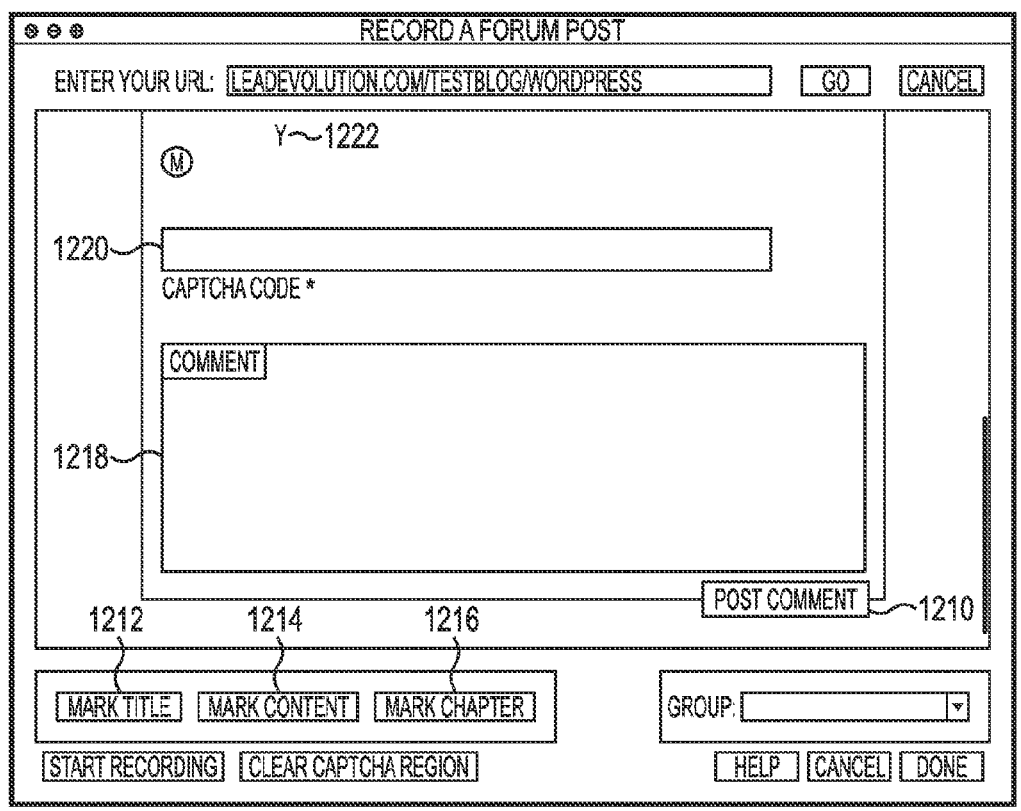
FIG. 12 is a screen shot of a first step in the process of recording the steps of posting content to a commentable web site showing highlighted action buttons.

Submit buttons whose clicks can be successfully recorded are identified by highlighting in green 1210 when the mouse or cursor is above them as shown in FIG. 12. The combination of yellow and green highlighting indicates to the user that the user can record a submission of the yellow form by right-clicking the green button. Simply recording the form submission won't be very useful if the user wants to submit different content in the future. Because of the possibility of differing content, a user may flag certain regions of the page as having variable content that can be changed on playback. The three buttons "mark title" 1212, "mark content" 1214 and "mark Captcha" 1216 set these flags. To use these buttons, a user needs to activate text cursors in the appropriate text fields and click the corresponding buttons. The buttons are color-coded so that their font color matches the text field highlight color.

Figure 13:
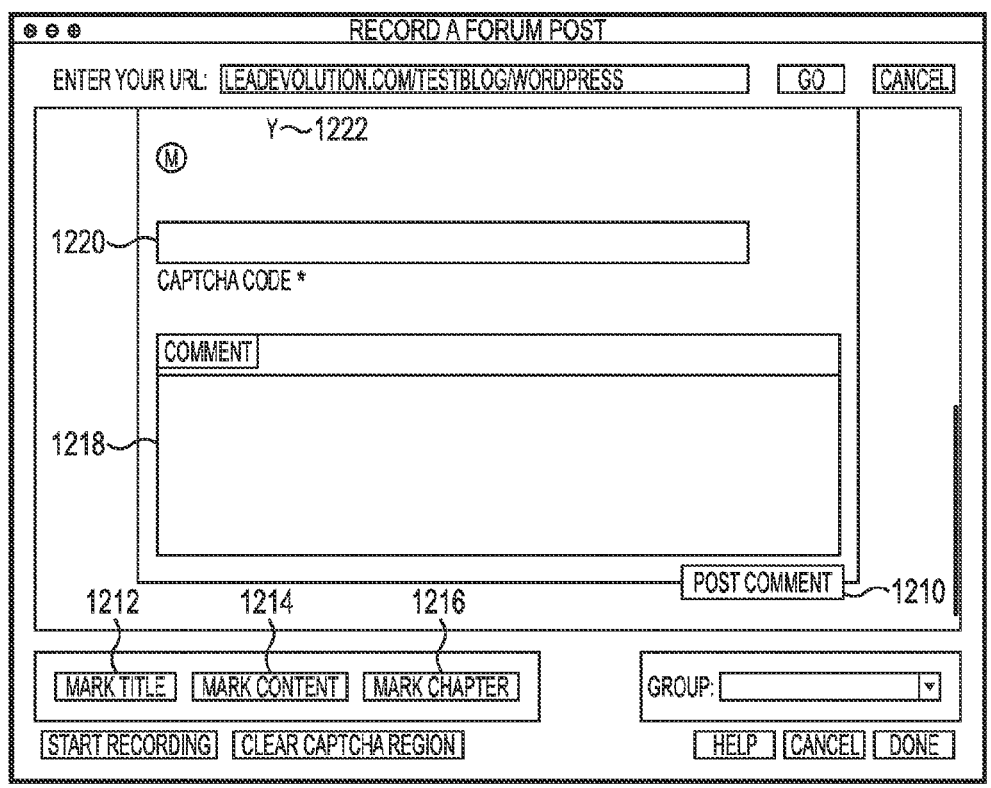
FIG. 13 is a screen shot of a first step in the process of recording the steps of posting content to a commentable web site showing highlighted entry fields color coordinated with their associated action buttons.

The result of using the "mark content" 1214 and "mark Captcha" 1216 buttons are illustrated in FIG. 13. The "mark content" button 1214 is highlighted in aqua and the "comment" box 1218 is also highlighted in aqua. The "mark Captcha" button 1216 is highlighted in blue and the Captcha code box 1220 is also highlighted in blue.

Figure 14:
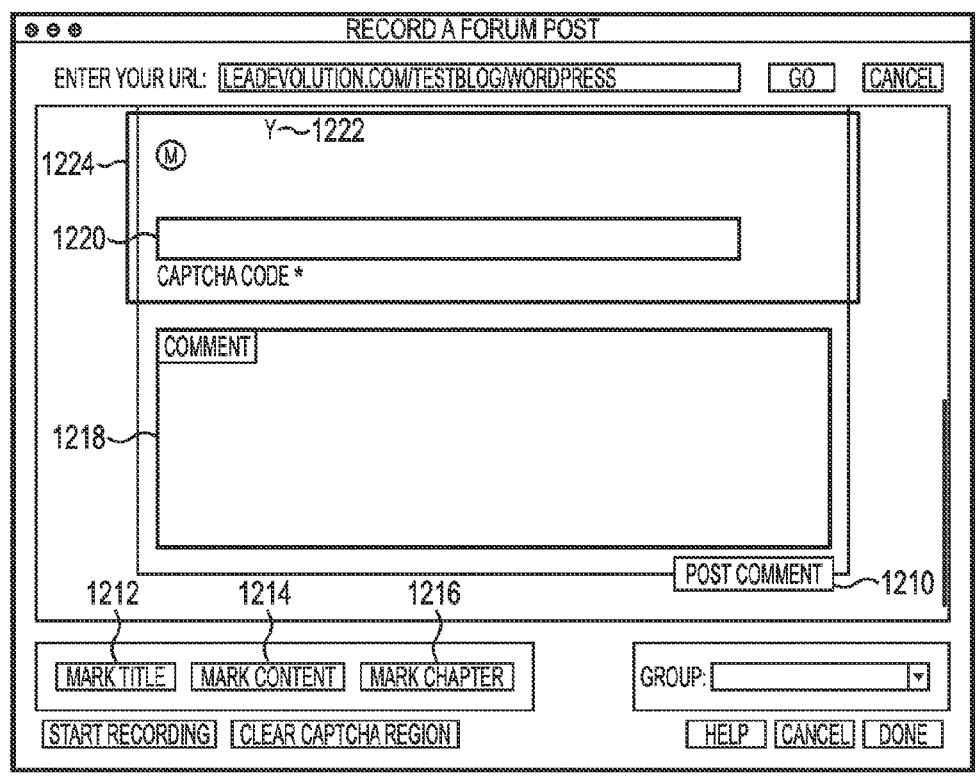
FIG. 14 is a screen shot of a first step in the process of recording the steps of posting content to a commentable web site showing highlighted user identified fields to be modified.

In addition, many web forms contain nontextual Captcha elements, for example the obfuscated "K47Y" graphic 1222 in FIGS. 12 through 14. To mark these nontextual Captcha elements, a user can right-click and drag a rectangle 1224 around the region of the page that contains Captcha elements as shown in FIG. 14.

Now that users have marked the web form appropriately, a user can record the form submission by right-clicking the "post comment" button 1210 for future playback. Upon playback all fields on the web form are auto-filled except the Captcha field 1220 which the user will be prompted to fill.

Forum interactions may also involve the following GET and POST requests: 1) GET: user enters URL of forum home page and clicks "go"; 2) GET: user clicks "login"; 3) POST:

user submits login form; 4) GET: user clicks "create new post"; and 5) POST: user submits a new post button.

FIG. 15 is an exemplary screen shot illustrating the results of submitted keyword phrases "wisconsin wedding photography", "madison wedding photographer" and "wisconsin wedding photographer".

FIG. 16 is an exemplary screen shot illustrating related key words including highlighting those words designated "hot" (over 10,000 monthly Google searches) and "warm" (over 1,000 monthly Google searches).

FIG. 17 is an exemplary screen shot illustrating the results of an analysis indicating back links, or "in links", to a target web site.

Figure 18:
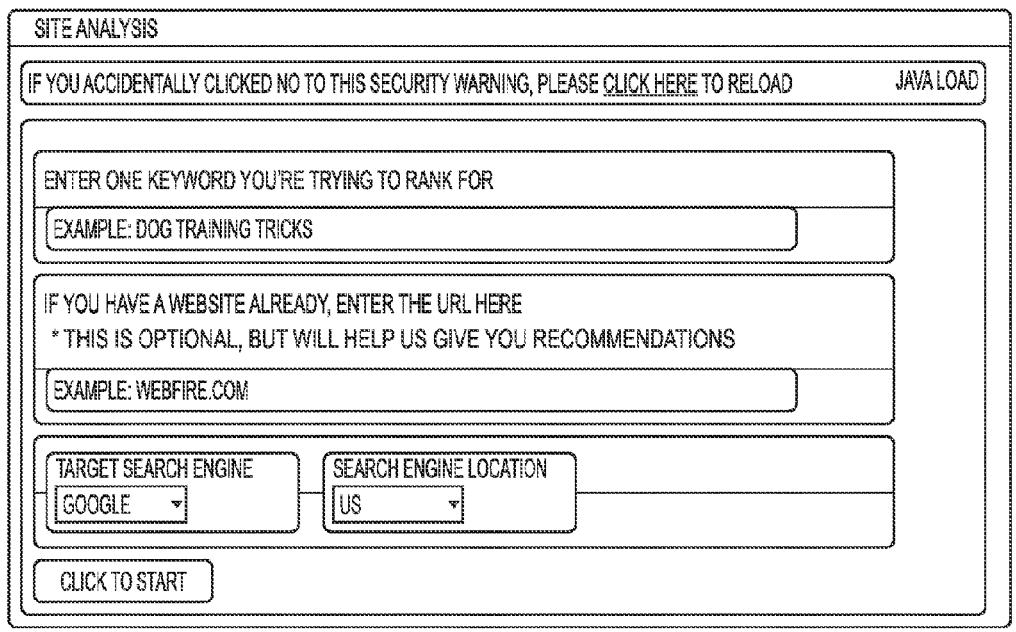
FIG. 18 is an exemplary screen shot illustrating a user selection of one keyword a target web site is trying to rank and the URL of the target website.

FIG. 18 is an exemplary screen shot illustrating a user selection of one keyword a target web site is trying to rank and the URL of the target website.

FIG. 19 and FIG. 20 are an exemplary screen shots illustrating the results of an analysis of a target web site and containing suggestions to improve the search ranking of the target web site.

Thus, embodiments of the method of interacting with web sites allowing commenting are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A device implemented method for interacting with a plurality of web sites, comprising the steps of:
   finding said plurality of web sites using a predetermined key word to create a subset of said plurality of web sites containing said predetermined key word;
   determining which of said subset of said plurality of web sites allow placement of comments on a respective one of said subset of said plurality of web sites creating a list of a plurality of commentable web sites containing said predetermined key word and which allow placement of comments;
   supplying said list of said plurality of commentable web sites to a user
   determining a plurality of steps, different for each of said plurality of commentable web sites, to post said comments on each of said plurality of commentable web sites, respectively;
   storing in digital memory said plurality of steps to post said comments on each of said plurality of commentable web sites; and
   subsequently repeating, separately for each of said plurality of commentable web sites, said plurality of steps to post said comments on each of said plurality of commentable web sites.

2. The method of claim 1 wherein said determining step comprises searching said subset of said plurality of web sites for specific input elements which allow for said placement of comments.

3. The method of claim 2 wherein said determining step comprises searching said subset of said plurality of web sites for code tags indicative of allowance for said placement of comments.

4. The method of claim 2 wherein said determining step comprises searching said subset of said plurality of web sites for identifiers of internet forum software packages.

5. The method of claim 2 wherein said determining step comprises searching said subset of said plurality of web sites for the string "comment".

6. The method of claim 2 wherein said determining step comprises searching said subset of said plurality of web sites for a leaf element that contains at least a predetermined number of words, contains the string "comment", and does not contain the string "site comment".

7. The method of claim 2 wherein said determining step comprises searching said subset of said plurality of web sites for a lowercase type attribute which is at least one of "button" and "submit", a lowercase value attribute contains the string "comment" and said lowercase value attribute does not contain the string "site comment".

8. The method of claim 1 wherein said determining step comprises determining, separately for each of said plurality of commentable web sites, whether cookies are utilized to post said comments of each of said plurality of commentable web site.

9. The method of claim 8 wherein said storing in digital memory step comprises storing, separately for each of said plurality of commentable web sites, respective cookies unique for each of said plurality of commentable web sites that are utilized by each of said plurality of commentable web sites to post comments on each respective one of said plurality of commentable web sites.

10. The method of claim 1 wherein said determining step comprises utilizing, separately for each of said plurality of commentable web sites, POST and GET commands to determine said plurality of steps, different for each of said commentable web sites, to post said comments on each of said commentable web sites, respectively.

11. The method of claim 1 wherein said storing in digital memory step comprises providing a step by step recording process to a user to implement the specific web forms used to accomplish said plurality of steps to post said comments on each of said plurality of commentable web sites.

12. The method of claim 11 wherein said subsequently repeating step comprises rendering said specific web forms in sequence to accomplish said plurality of steps to post said comments on each of said plurality of commentable web sites.

13. The method of claim 11 wherein said storing in digital memory step further comprises allowing said user to mark said specific web forms for later user input.

14. The method of claim 13 wherein said subsequently repeating step further comprises highlighting a specific portion of said specific web forms marked by said user for user input to accomplish said plurality of steps to post said comments on each of said plurality of commentable web sites.

15. The method of claim 11 wherein said step of the subsequently repeating step comprises posting different content of each of said plurality of commentable web sites.

16. The method of claim 11 further comprising the step of modifying said comments of one of said plurality of web sites for use in posting on another of said plurality of commentable web sites.

17. The method of claim 1 further comprising automatically modifying at least one of said subset of said plurality of web sites to increase a search ranking of said at least one of said subset of said plurality of web sites.

18. A non-transitive machine readable storage medium storing executable program instructions which when executed cause a data processing system to perform a method comprising the steps of:
   finding a plurality of web sites using a predetermined key word to create a subset of said plurality of web sites containing said predetermined key word;

determining which of said subset of said plurality of web sites allow placement of comments on a respective one of said subset of said plurality of web sites creating a list of a plurality of commentable web sites containing said predetermined key word and which allow placement of comments;

supplying said list of said plurality of commentable web sites to a user;

determining a plurality of steps, different for each of said plurality of commentable web sites, to post said comments on each of said plurality of commentable web sites, respectively;

storing in digital memory said plurality of steps to post said comments on each of said plurality of commentable web sites; and subsequently repeating, separately for each of said plurality of commentable web sites, said plurality of steps to post said comments on each of said plurality of commentable web sites.

19. The non-transitive machine readable storage medium of claim 18 wherein said determining step comprises searching said subset of said plurality of web sites for specific input elements which allow for said placement of comments.

20. The non-transitive machine readable storage medium of claim 19 wherein said determining step comprises searching said subset of said plurality of web sites for code tags indicative of allowance for said placement of comments.

21. The non-transitive machine readable storage medium of claim 19 wherein said determining step comprises searching said subset of said plurality of web sites for identifiers of internet forum software packages.

22. The non-transitive machine readable storage medium of claim 19 wherein said determining step comprises searching said subset of said plurality of web sites for the string "comment".

23. The non-transitive machine readable storage medium of claim 19 wherein said determining step comprises searching said subset of said plurality of web sites for a leaf element that contains at least a predetermined number of words, contains the string "comment", and does not contain the string "site comment".

24. The non-transitive machine readable storage medium of claim 19 wherein said determining step comprises searching said subset of said plurality of web sites for a lowercase type attribute which is at least one of "button" and "submit", a lowercase value attribute contains the string "comment" and said lowercase value attribute does not contain the string "site comment".

25. The non-transitive machine readable storage medium of claim 18 wherein said determining step comprises determining, separately for each of said plurality of commentable web sites, whether cookies are utilized to post said comments of each of said plurality of commentable web site.

26. The non-transitive machine readable storage medium of claim 25 wherein said storing in digital memory step comprises storing, separately for each of said plurality of commentable web sites, respective cookies unique for each of said plurality of commentable web sites.

27. The non-transitive machine readable storage medium of claim 18 wherein said determining step comprises utilizing, separately for each of said plurality of commentable web sites, POST and GET commands to determine said plurality of steps, different for each of said commentable web sites, to post said comments on each of said commentable web sites, respectively.

28. The non-transitive machine readable storage medium of claim 18 wherein said storing in digital memory step comprises providing a step by step recording process to a user to implement the specific web forms used to accomplish said plurality of steps to post said comments on each of said plurality of commentable web sites.

29. The non-transitive machine readable storage medium of claim 28 wherein said subsequently repeating step comprises rendering said specific web forms in sequence to accomplish said plurality of steps to post said comments on each of said plurality of commentable web sites.

30. The non-transitive machine readable storage medium of claim 28 wherein said storing in digital memory step further comprises allowing said user to mark said specific web forms for later user input.

31. The non-transitive machine readable storage medium of claim 30 wherein said subsequently repeating step further comprises highlighting a specific portion of said specific web forms marked by said user for user input to accomplish said plurality of steps to post said comments on each of said plurality of commentable web sites.

32. The non-transitive machine readable storage medium of claim 28 further comprising the step of modifying said comments of one of said plurality of web sites for use in posting on another of said plurality of commentable web sites.

33. The non-transitive machine readable storage medium of claim 18 wherein said step of subsequently repeating step comprises posting different content of each of said plurality of commentable web sites.

34. The non-transitive machine readable storage medium of claim 18 further comprising automatically modifying at least one of said subset of said plurality of web sites to increase a search ranking of said at least one of said subset of said plurality of web sites.

* * * * *

UNITED STATES PATENT AND TRADEMARK OFFICE
CERTIFICATE OF CORRECTION

PATENT NO. : 9,589,054 B2  
APPLICATION NO. : 13/828975  
DATED : March 7, 2017  
INVENTOR(S) : Kosobucki et al.

Page 1 of 1

It is certified that error appears in the above-identified patent and that said Letters Patent is hereby corrected as shown below:

In the Claims

At Column 12, Claim 15, Line 49, replace "method of claim 11 wherein said step" with --method of claim 1 wherein said step--

At Column 13, Claim 18, Line 18, replace "to post said comments on each" with --to post comments on each--

Signed and Sealed this  
Second Day of October, 2018

Andrei Iancu  
*Director of the United States Patent and Trademark Office*